United States Patent
Gupta et al.

(10) Patent No.: US 9,706,006 B2
(45) Date of Patent: Jul. 11, 2017

(54) SYSTEM AND METHOD OF CONTEXT AWARE ADAPTION OF CONTENT FOR A MOBILE DEVICE

(75) Inventors: Puneet Gupta, Bangalore (IN); Venkat Kumar Sivaramamurthy, Bangalore (IN); Karthik Gopalakrishnan Vinmani, Bangalore (IN); Robin Pahwa, Lucknow (IN); Akshay Darbari, Bangalore (IN)

(73) Assignee: Infosys Limited, Bangalore (IN)

(*) Notice: Subject to any disclaimer, the term of this patent is extended or adjusted under 35 U.S.C. 154(b) by 1000 days.

(21) Appl. No.: 13/344,999

(22) Filed: Jan. 6, 2012

(65) Prior Publication Data

US 2013/0024766 A1    Jan. 24, 2013

(30) Foreign Application Priority Data

Jul. 19, 2011    (IN) .......................... 2448/CHE/2011

(51) Int. Cl.
*G06F 17/00* (2006.01)
*H04L 29/08* (2006.01)
*G06F 17/21* (2006.01)

(52) U.S. Cl.
CPC ........ *H04L 67/2823* (2013.01); *G06F 17/211* (2013.01)

(58) Field of Classification Search
CPC .................................................. G06F 17/211
USPC ................................ 715/234, 238, 744, 746
See application file for complete search history.

(56) References Cited

U.S. PATENT DOCUMENTS

| | | | |
|---|---|---|---|
| 5,881,289 A * | 3/1999 | Duggan et al. ............... | 717/145 |
| 6,023,714 A * | 2/2000 | Hill ........................ | G06F 17/211 |
| | | | 715/235 |
| 6,421,717 B1 * | 7/2002 | Kloba et al. ................. | 709/219 |
| 6,453,465 B1 * | 9/2002 | Klein ............................ | 717/141 |
| 6,496,979 B1 * | 12/2002 | Chen et al. ................... | 717/178 |
| 6,615,253 B1 * | 9/2003 | Bowman-Amuah ......... | 709/219 |
| 6,845,394 B2 * | 1/2005 | Ritche .......................... | 709/221 |
| 7,200,809 B1 * | 4/2007 | Paul et al. .................... | 715/205 |
| 7,210,121 B2 * | 4/2007 | Xia et al. ..................... | 717/106 |
| 7,340,730 B2 * | 3/2008 | Arkwright et al. ........... | 717/148 |
| 8,209,709 B2 * | 6/2012 | Fleming ....................... | 719/318 |
| 2004/0143823 A1 * | 7/2004 | Wei .............................. | 717/140 |
| 2006/0248506 A1 * | 11/2006 | Luo et al. ..................... | 717/104 |
| 2007/0061486 A1 * | 3/2007 | Trinh et al. .................. | 709/246 |
| 2007/0061488 A1 * | 3/2007 | Alagappan et al. .......... | 709/246 |
| 2007/0300217 A1 * | 12/2007 | Tunmer et al. ............... | 717/177 |
| 2008/0016182 A1 * | 1/2008 | Sathish et al. ............... | 709/219 |
| 2008/0139191 A1 * | 6/2008 | Melnyk et al. ............... | 455/419 |
| 2008/0282172 A1 * | 11/2008 | Bayang et al. ............... | 715/744 |
| 2008/0313659 A1 * | 12/2008 | Eide et al. .................... | 719/328 |
| 2009/0119678 A1 * | 5/2009 | Shih et al. .................... | 719/313 |

(Continued)

*Primary Examiner* — Mohammed-Ibrahim Zuberi
(74) *Attorney, Agent, or Firm* — Klarquist Sparkman, LLP

(57) ABSTRACT

The invention relates to a system and method of context aware adaption of content for a mobile device. This involves identifying context parameters and associated values, selection of content layout based on context parameters. Content layout is selected from pre-configured content layouts based on context parameters. The content is retrieved from a content store. Content style is selected from pre-configured content styles based on context parameters. Rendering content on the device display based on the selected content layout, content style and at least one context parameter.

29 Claims, 5 Drawing Sheets

(56) References Cited

U.S. PATENT DOCUMENTS

| | | | |
|---|---|---|---|
| 2009/0241135 A1* | 9/2009 | Wong et al. | 719/328 |
| 2009/0249076 A1* | 10/2009 | Reed et al. | 713/181 |
| 2010/0174607 A1* | 7/2010 | Henkin et al. | 705/14.53 |
| 2010/0241664 A1* | 9/2010 | LeVasseur et al. | 707/779 |
| 2010/0281475 A1* | 11/2010 | Jain et al. | 717/172 |
| 2011/0072086 A1* | 3/2011 | Newsome et al. | 709/204 |
| 2011/0083069 A1* | 4/2011 | Paul et al. | 715/234 |
| 2011/0087955 A1* | 4/2011 | Ho | G06F 17/211 715/230 |
| 2011/0113090 A1* | 5/2011 | Peeri | 709/203 |
| 2011/0154305 A1* | 6/2011 | LeRoux et al. | 717/140 |
| 2011/0320525 A1* | 12/2011 | Agarwal et al. | 709/203 |
| 2012/0072926 A1* | 3/2012 | Woo et al. | 719/328 |
| 2012/0130801 A1* | 5/2012 | Baranov et al. | 705/14.43 |
| 2012/0137211 A1* | 5/2012 | Lewontin | 715/236 |
| 2012/0137233 A1* | 5/2012 | Lewontin | 715/760 |
| 2012/0158893 A1* | 6/2012 | Boyns et al. | 709/217 |
| 2012/0159314 A1* | 6/2012 | Schrier | G06F 17/30905 715/252 |
| 2012/0166979 A1* | 6/2012 | Lewontin | 715/762 |
| 2013/0091251 A1* | 4/2013 | Walker | H04N 21/8455 709/219 |
| 2014/0136952 A1* | 5/2014 | Zhu | G06F 17/2247 715/234 |

* cited by examiner

SYSTEM AND METHOD OF CONTEXT AWARE ADAPTION OF CONTENT FOR A MOBILE DEVICE

RELATED APPLICATION DATA

This application claims priority to Indian Patent Application No. 2448/CHE/2011, filed Jul. 19, 2011, which is hereby incorporated by reference in its entirety.

FIELD OF THE INVENTION

The present technique is in the field of mobile device software. In particular, this invention relates to a system and method of context aware adaption of content for a mobile device.

BACKGROUND

The current approach towards delivering web applications to handheld devices relies predominantly on the server. The database, business logic and presentation layer reside on the respective servers which act to serve content to mobile devices. This approach to delivering web content is suitable for web browsers running on personal computers.

In the past decade, there has been a proliferation in the variety of mobile devices. Variations in these mobile devices are usually in screen size, display resolution, computing power and presence of natural input mechanisms like touch interfaces. The availability of mobile devices with varied configurations requires the web server to customize content in order to be able to be rendered on disparate browsers present in mobile devices. Hence, the web server is required to maintain a database of device capabilities and configurations. The presence of such a database on the web server allows content to be customized for a particular device requesting content from a web server. One of the disadvantages in maintaining a database of device capabilities and configurations is that the database has to be updated with the entry of each new mobile device into the market. Furthermore, multiple vendors release devices with a variety of capabilities and configurations.

The disadvantage with the above approach is the dependence on a server for all functional tasks, and dependence on a browser present in operating system or third party browsers installed in mobile devices for rendering content. Further, present web applications delivered using a server-centric approach do not take advantage of the underlying mobile operating system capabilities such as by leveraging the device configuration set by the user or network. Hence, there is a need for a new approach to deliver web applications to mobile devices which overcome these disadvantages.

SUMMARY OF THE INVENTION

The present invention relates to a method of context aware adaption of content for a mobile device. The method involves identifying multiple context parameters and associated context parameter values. After identifying context parameters and its respective values, selecting a content layout from pre-configured content layouts based on the context parameters and values. After this, content is retrieved from a content store. This is followed by selecting a content style from a set of pre-configured content styles based on context parameters and their respective values. The content is then rendered on the device display based on the selected content style, the content layout and at least one context parameter value.

The present invention relates to a system for context aware adaption of content for a mobile device. The system comprises an analysis module configured to identify multiple context parameters and corresponding values for the identified context parameters. The layout module is configured to select a content layout from pre-configured content layouts, based on the context parameter values. The system also comprises an interface module which is configured to retrieve content from a content store. A content engine is configured to select a content style from pre-configured content styles based on the context parameters and their respective values. A rendering module renders the content on a device display based on the selected content style, the content layout and at least one context parameter value.

BRIEF DESCRIPTION OF THE DRAWINGS

These and other features, aspects, and advantages of the present invention will be better understood when the following detailed description is read with reference to the accompanying drawings in which like characters represent like parts throughout the drawings, wherein.

DETAILED DESCRIPTION

The following description is the full and informative description of the best method and system presently contemplated for carrying out the present invention which is known to the inventors at the time of filing the patent application. Of course, many modifications and adaptations will be apparent to those skilled in the relevant arts in view of the following description in view of the accompanying drawings and the appended claims. While the system and method described herein are provided with a certain degree of specificity, the present technique may be implemented with either greater or lesser specificity, depending on the needs of the user. Further, some of the features of the present technique may be used to get an advantage without the corresponding use of other features described in the following paragraphs. As such, the present description should be considered as merely illustrative of the principles of the present technique and not in limitation thereof, since the present technique is defined solely by the claims.

Figure 1:
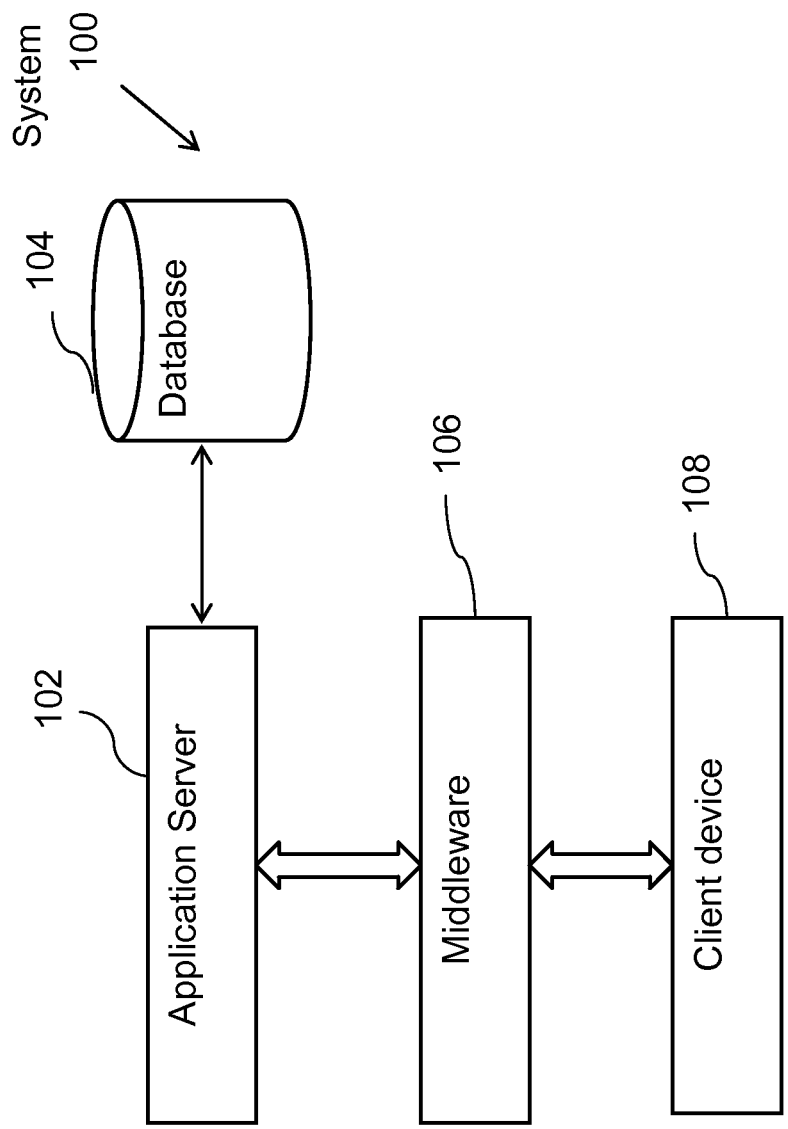
FIG. 1 shows an environment in which the present invention can be practiced, in accordance with an embodiment of the present invention.

FIG. 1 shows an environment 100 in which the present invention can be practiced, in accordance with an embodiment of the present invention. Environment includes an application server 102, a database 104, a middleware 106 and a client device 108.

Application server 102 is connected to the middleware 106 over a communication network. The middleware 106 is connected to a client device 108 over a communication network. Application server is an environment where a software framework allows application to be executed. It allows execution of routines, programs, scripts. An example of application server is Apache Tomcat running an application for Internet banking. The application server 102 is connected to a database 104. The database 104 is connected to the application server over a communication network. Examples of database include relational database management system, object oriented database system, graph database, key-value store and tabular database. The application server 102 uses the data for persistent storage of information. Middleware 106 is software that allows multiple software applications to connect or integrate among each other. Use of middleware increases interoperability among software applications that are distributed across network. The client device 108 is connected to the middleware over a communication network. Examples of client device comprise mobile phones, smart phones and portable tablets.

In accordance with an embodiment of the present invention, a request from client device 108 to access the application 102 is first sent to the middleware 106. The middleware 106 converts request from client device 108 to appropriate format or protocol that is compatible with the application server 102 and is sent to the application server 102. The application server 102 uses the database 104 to generate the response. The application server 102 sends the response to the middleware 106 and the middleware 106 converts the response to an appropriate format or protocol that is compatible with the client device 108.

Figure 2:
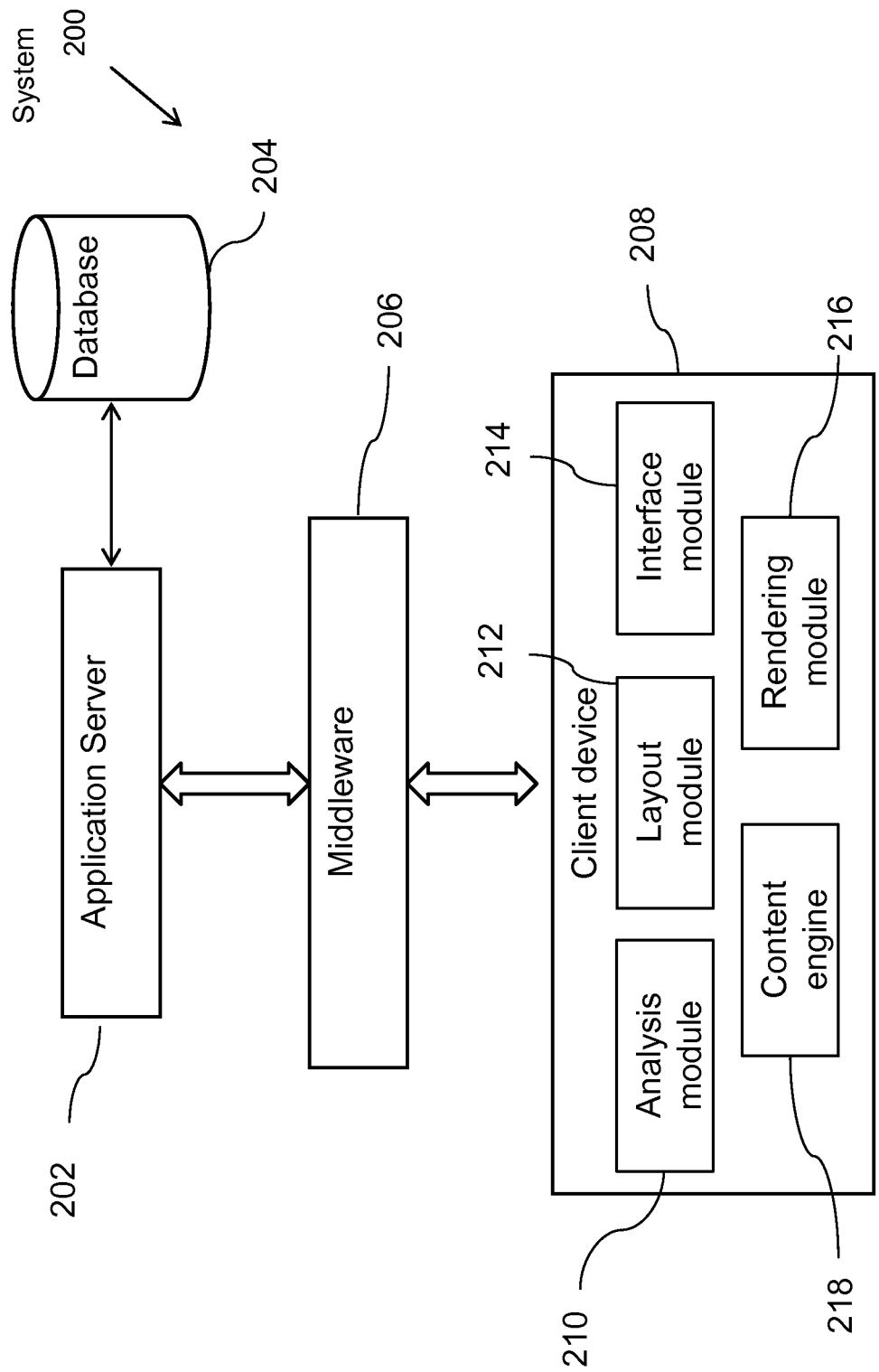
FIG. 2 shows the block diagram of the system, in accordance with an embodiment of the present invention.

FIG. 2 shows the block diagram of the system, in accordance with an embodiment of the present invention. The system comprises an application server 202, a database 204, a middleware 206, and a client device 208. The client device 208 has the following components: an analysis module 210, a layout module 212, an interface module 214, a rendering module 216 and a content engine 218. The application server 202, the database 204, the middleware 206 and the client device 208 have been described earlier in conjunction with FIG. 1 and hence, are not described again. An application is software program that is executed on the client device 208. An application that is installed on a client device comprises workflow for the business processes. Workflow is a combination of web pages or user interfaces. Web pages or user interface is a combination of content, content layout, content style and user interface controls. Application installation is the process in which the software program is stored on the client device 208 comprising storage of configuration files and executable programs that are essential for operation of the application.

The analysis module performs the function of identifying the context parameters and the associated values of context parameters. Examples of context parameters include device specific capabilities and user configured device preferences. Some of the device specific capabilities comprise GPS support, Bluetooth support, network security capabilities supported by the device, bandwidth, type of the bearer channel and capabilities available in associated peripheral devices like Bluetooth headset. Some of the user configured device preferences comprise general device settings, network settings, time zones, user settings, user profile including personal information and multimedia settings. The layout module 212 performs the function of selecting a particular layout from a set of pre-configured content layouts which are made available during the time of application installation. This selection of content layout is based on the context parameters and their values. The interface module 214 performs the function of connecting with a content store using the network or connecting with the database stored on the client device to receive and send content, along with request for content. The database 204 connected to the application server 202 acts as a content store when the content is received from the application server 202. Examples of content comprise text, images, videos and animations. The content engine 218 performs the function of selecting a particular content style from a set of pre-configured content styles that are made available during the time of application installation. The selection of a particular content style is based on context parameters and their associated values. The rendering module 216 uses the content layout selected by the layout module 212 and the content style selected by the content engine 218 along with content received by the interface module, it applies the selected content layout and content style to the content and the content is then rendered on the device display.

In accordance with an embodiment of the present invention, the analysis module 210 at the client device identifies context parameters. An example of context parameter is bandwidth of the channel. The layout module 212 uses the context parameter i.e., bandwidth of the channel to select one content layout out of pre-configured layouts that are made available during the time of installation. The interface module 214 at the client device 208 sends a request to an application running on application server 202. The request to the application is first sent to the middleware 206. The middleware 206 then communicates with the application server 202. When the client device 208 sends a request for content to the application server 202 using the middleware 206, the application server 202 receives the content from the database 204. The response from the application server 202 is then received at the middleware 206 and is converted to a format or protocol that is compatible with the client device 208, at the middleware. The response is now received by the interface module 214. The content engine 218 selects a content style out of pre-configured content styles made available during installation, based on the context parameter i.e., bandwidth of the channel. The rendering module 216 combines the selected content layout and content style and at least one of context parameters to render on the device display.

Figure 3:
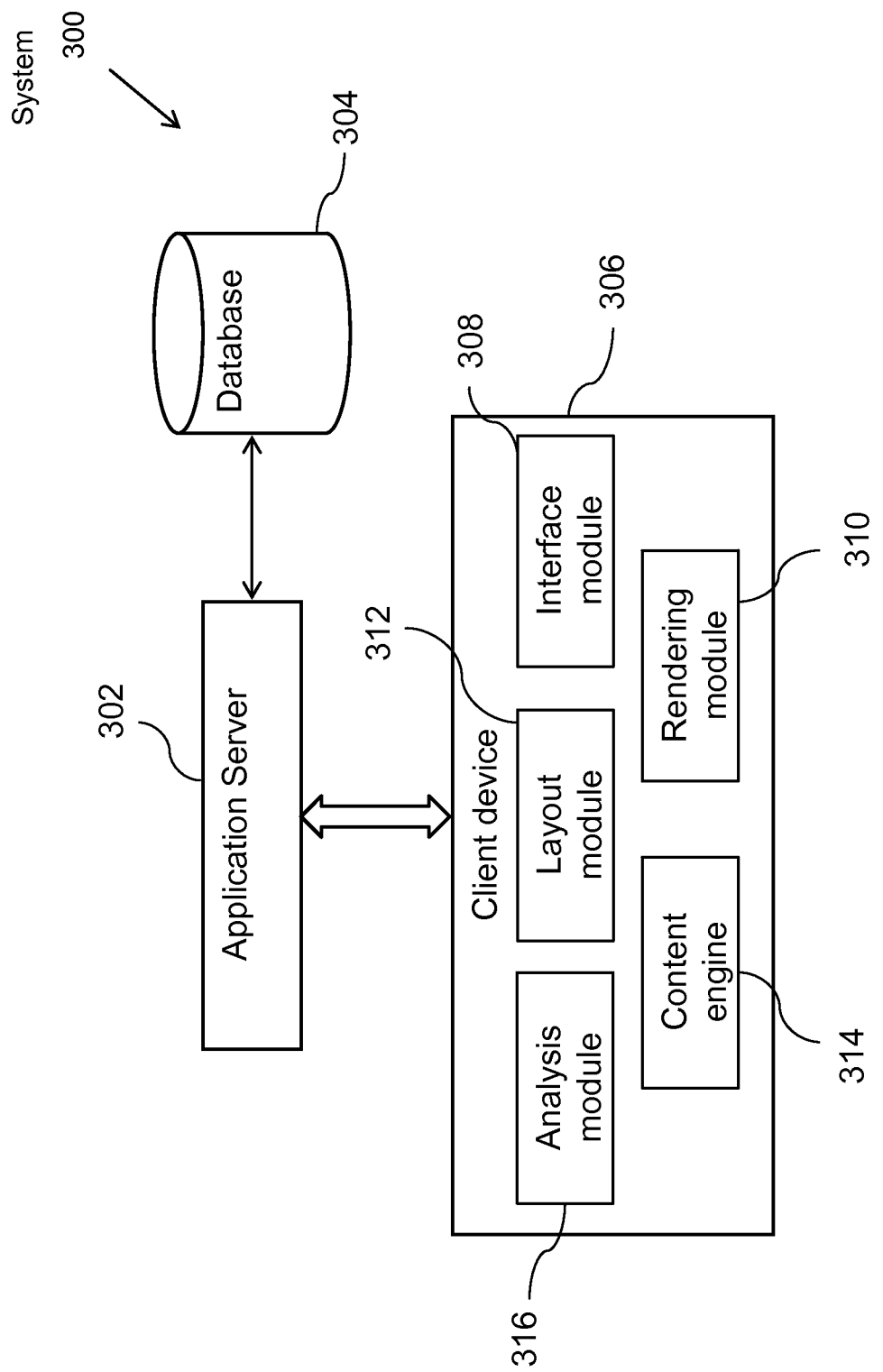
FIG. 3 shows the block diagram of the system, in accordance with another embodiment of the present invention.

FIG. 3 shows the block diagram of the system, in accordance with another embodiment of the present invention. The system comprises an application server 302, a database 304, and a client device 306. The client device 306 comprises an analysis module 316, a layout module 312, an interface module 308, a content engine 314, and a rendering module 310. The application server 302, database 304, client device 306, analysis module 316, layout module 312, interface module 308, content engine 314, and rendering module 310 have been described earlier in conjunction with FIG. 2 and hence, are not described again.

In accordance with an embodiment of the present invention, the analysis module 316 at the client device identifies context parameters. An example of context parameter is bandwidth of the channel. The layout module 312 uses the context parameter i.e., bandwidth of the channel to select one content layout out of pre-configured layouts that are made available during the time of installation. The interface module 308 at the client device 306 sends a request to an application running on application server 302. When the client device 306 sends a request for content to the application server 302, the application server 302 receives the content from the database 304. The response from the application server 302 is then received at the client device 306. The response is now received by the interface module 308. The content engine 314 selects a content style out of pre-configured content styles made available during installation, based on the context parameter i.e., bandwidth of the channel. The rendering module 310 combines the selected content layout and content style and renders on the device display based on at least one context parameter.

Figure 4:
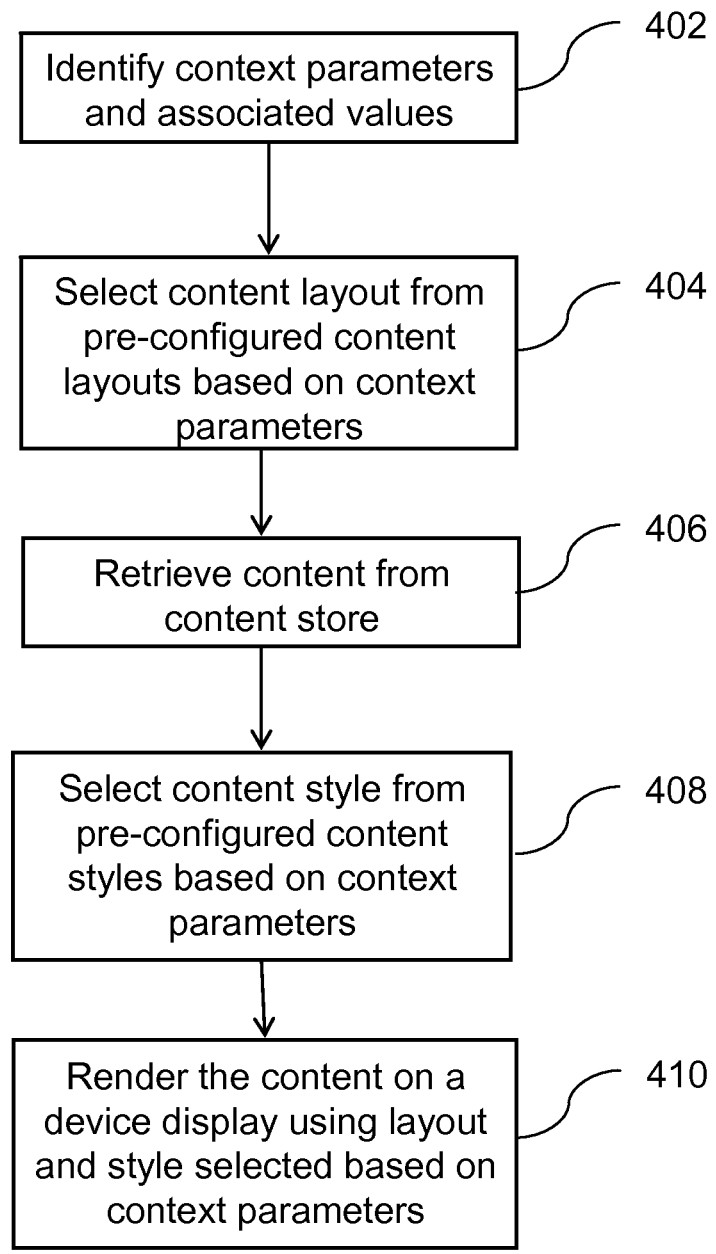
FIG. 4 represents a flowchart describing the process involved in an embodiment.

FIG. 4 represents a flowchart describing the method involved in an embodiment. Identification of context parameters and their associated values is performed at step 402. Examples of context parameters include device specific capabilities and user configured device preferences, as described earlier. Selection of a content layout from pre-configured layouts is performed at step 404. Based on one or more of context parameter an appropriate layout is chosen. For example, if the bandwidth of the channel is low, then a content layout which displays content across multiple pages is chosen.

The content is retrieved from a content store at step 406. An example of a content store is database connected to the application server. Content may also be retrieved from other sources like content management systems or a database present on the client device.

Content style is selected from pre-configured content styles based on context parameters at step 408. For example, content style is selected based user setting which may be a user selected font. At step 410, content is rendered on the device display with the selected content layout, content style and at least one context parameters.

Exemplary Computing Environment

Figure 5:
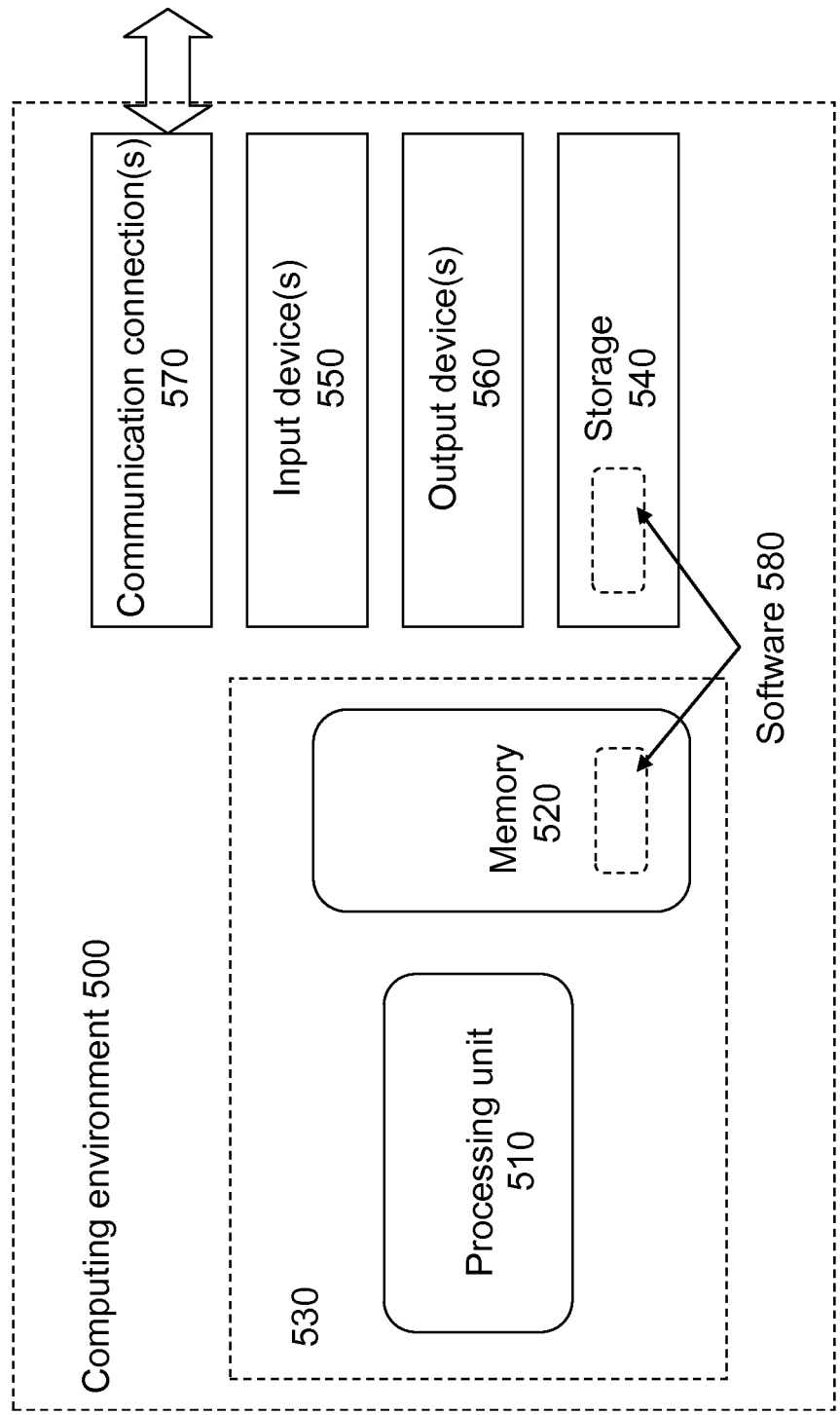
FIG. 5 illustrates a generalized example of a computing environment.

One or more of the above-described techniques can be implemented in or involve one or more computer systems. FIG. 5 illustrates a generalized example of a computing environment 500. The computing environment 500 is not intended to suggest any limitation as to scope of use or functionality of described embodiments.

With reference to FIG. 5, the computing environment 500 includes at least one processing unit 510 and memory 520. In FIG. 5, this most basic configuration 530 is included within a dashed line. The processing unit 510 executes computer-executable instructions and may be a real or a virtual processor. In a multi-processing system, multiple processing units execute computer-executable instructions to increase processing power. The memory 520 may be volatile memory (e.g., registers, cache, RAM), non-volatile memory (e.g., ROM, EEPROM, flash memory, etc.), or some combination of the two. In some embodiments, the memory 520 stores software 580 implementing described techniques.

A computing environment may have additional features. For example, the computing environment 500 includes storage 540, one or more input devices 550, one or more output devices 560, and one or more communication connections 570. An interconnection mechanism (not shown) such as a bus, controller, or network interconnects the components of the computing environment 500. Typically, operating system software (not shown) provides an operating environment for other software executing in the computing environment 500, and coordinates activities of the components of the computing environment 500.

The storage 540 may be removable or non-removable, and includes magnetic disks, magnetic tapes or cassettes, CD-ROMs, CD-RWs, DVDs, or any other medium which can be used to store information and which can be accessed within the computing environment 500. In some embodiments, the storage 540 stores instructions for the software 580.

The input device(s) 550 may be a touch input device such as a keyboard, mouse, pen, trackball, touch screen, or game controller, a voice input device, a scanning device, a digital camera, or another device that provides input to the computing environment 500. The output device(s) 560 may be a display, printer, speaker, or another device that provides output from the computing environment 500.

The communication connection(s) 570 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the general context of computer-readable media. Computer-readable media are any available media that can be accessed within a computing environment. By way of example, and not limitation, within the computing environment 500, computer-readable media include memory 520, storage 540, communication media, and combinations of any of the above.

Having described and illustrated the principles of our invention with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

As will be appreciated by those ordinary skilled in the art, the foregoing example, demonstrations, and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine readable media, such as on memory chips, local or remote hard disks, optical disks or other media, which may be accessed by a processor based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a computer memory.

The following description is presented to enable a person of ordinary skill in the art to make and use the invention and is provided in the context of the requirement for a obtaining a patent. The present description is the best presently-contemplated method for carrying out the present invention. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

What is claimed is:

1. A computer implemented method of context aware adaption of content for a mobile device comprising:
   identifying, by a mobile device, a plurality of context parameters and associated context parameter values indicative of the plurality of context parameters, the context parameters being relevant to how content received from a content store is rendered on the mobile device and being based on at least one of: one or more detected capabilities of the mobile device or one or more detected user preferences;
   selecting, by the mobile device, a content layout from a plurality of pre-configured content layouts based on at least one of the plurality of context parameter values, the selecting not directly specified by the content, the content layouts stored and renderable on the mobile device;
   retrieving, by the mobile device, content requested by an application execution, the retrieving comprising sending a request to the content store for content specified by the selected content layout;
   receiving a response from the content store, the response comprising the content specified by the selected content layout;
   selecting, by the mobile device, a content style from a plurality of pre-configured content styles stored on the mobile device based on at least one of the context parameter values; and
   rendering, by the mobile device, the content associated with the response on a device display, based on the selected content style, the selected content layout, and at the least one context parameter value.

2. The method of claim 1, wherein the plurality of context parameters comprises at least one mobile device specific capability.

3. The method of claim 2, wherein the mobile device specific capabilities comprise GPS support, Bluetooth support, network security capabilities, bandwidth of the channel and type of bearer channel.

4. The method of claim 1, wherein the content associated with the response is in a local content store present on the mobile device.

5. The method of claim 1, wherein the content associated with the response is received from an application server.

6. The method of claim 1, wherein the plurality of context parameters comprise mobile device settings, network settings, time zones, user specified device settings and multimedia settings.

7. The method of claim 1, wherein the pre-configured content layouts are made available during application installation.

8. The method of claim 1, wherein the pre-configured content styles are made available during application installation.

9. The method of claim 1, wherein one or more of the preconfigured layouts are updated by a user application based on the response.

10. The method of claim 1, wherein one or more of the preconfigured content styles are updated by a user application based on the response.

11. The method of claim 1, wherein a local content store present on the mobile device is updated by a user application based on content associated with the response.

12. A system of a mobile device for context aware adaption of content for a mobile device comprising:
    the mobile device being configured to receive a response related to an application execution, the response originating from a remote computer;
    an analysis module, within a mobile device, configured to identify one or more context parameters and one or more context parameter values, the one or more context parameters being relevant to how content associated with the response is rendered on the mobile device and being based on at least one of: one or more detected capabilities of the mobile device or one or more detected user preferences;
    a layout module, within the mobile device, configured to select a content layout from a plurality of pre-configured content layouts stored and renderable on the mobile device, based on at least one if the one or more context parameter values;
    an interface module, within the mobile device, configured to retrieve the content associated with the response, the retrieving comprising sending a request to a content store for data specified by the selected content layout;
    a content engine, within the mobile device, configured to select a content style from a plurality of pre-configured content styles stored on the mobile device, based on at least one of the one or more context parameter values; and
    a rendering module, within the mobile device, configured to render the content associated with the response on the device display, based on the selected content style, the selected content layout and at least one context parameter value.

13. The system of claim 12, wherein the one or more context parameters comprise one or more mobile device specific capabilities detectable by the analysis module.

14. The system of claim 13, wherein the mobile device specific capabilities comprise GPS support, Bluetooth support, network security capabilities, bandwidth of the channel and type of bearer channel.

15. The system of claim 13, wherein the one or more context parameters comprise one or more user configured mobile device preferences, and wherein the user configured mobile device preferences comprise mobile device settings, network settings, time zones, user specified device settings and multimedia settings and the analysis module reads user configured mobile device preferences.

16. The system of claim 12, wherein a plurality of pre-configured content layouts are stored during the time of application installation.

17. The system of claim 12, wherein the pre-configured content styles are made available during application installation.

18. The system of claim 12, wherein the interface module retrieves the content associated with the response from a local content store present on the mobile device.

19. The system of claim 12, wherein the content associated with the response is included in the response.

20. The method of claim 1, wherein the plurality of context parameters comprises settings selected by the user.

21. The method of claim 12, wherein the plurality of context parameters includes bandwidth of a channel.

22. The method of claim 1, wherein the content store is a remote computer comprising an application server.

23. The method of claim 1, wherein the content store is a remote computer comprising a middleware server, the response originating from an application server.

24. The method of claim 1, wherein the response is an application update.

25. The method of claim 1, wherein the response is received in response to a content request.

26. The method of claim 1, wherein the response includes new context parameters relevant to the application execution, the method further comprising generating new context parameter values associated with the new context parameters.

27. The method of claim 1, wherein the application execution is a web-application execution at the client device.

28. The method of claim 1, wherein the pre-configured content styles are unrelated to a mobile device model.

29. A non-transitory computer readable storage medium having stored thereon computer executable instructions for performing context aware adaption of content for a mobile device comprising:

identifying, by a mobile device, a plurality of context parameters and associated context parameter values indicative of the plurality of context parameters, the context parameters being relevant to how content received from a content store is rendered on the mobile device and being based on at least one of: one or more detected capabilities of the mobile device or one or more detected user preferences, the plurality of context parameters comprising mobile device settings, network settings, time zones, user specified device settings, and multimedia settings;

selecting, by the mobile device, a content layout from a plurality of pre-configured content layouts based on at least one of the plurality of context parameter values, the selecting not directly specified by the content, the content layouts stored and renderable on the mobile device, the plurality of pre-configured content layouts having been made available and stored during application installation;

retrieving, by the mobile device, content requested by an application execution, the retrieving comprising sending a request to the content store for content specified by the selected content layout, the content store comprising a database in communication with an application server;

receiving a response from the content store, the response comprising the content specified by the selected content layout;

selecting, by the mobile device, a content style from a plurality of pre-configured content styles stored on the mobile device based on at least one of the context parameter values; and rendering, by the mobile device, the content associated with the response on a device display, based on the selected content style, the selected content layout, and at the least one context parameter value.

* * * * *